United States Patent
Lanante et al.

(10) Patent No.: US 10,772,138 B2
(45) Date of Patent: Sep. 8, 2020

(54) WIRELESS LAN SYSTEM, WIRELESS LAN BASE STATION, WIRELESS LAN TERMINAL, AND COMMUNICATION METHOD

(71) Applicant: NEC CORPORATION, Tokyo (JP)

(72) Inventors: Leonardo Lanante, Kitakyushu (JP); Yuhei Nagao, Iizuka (JP); Hiroshi Ochi, Kitakyushu (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/331,214

(22) PCT Filed: Aug. 9, 2017

(86) PCT No.: PCT/JP2017/028867
§ 371 (c)(1),
(2) Date: Mar. 7, 2019

(87) PCT Pub. No.: WO2018/047570
PCT Pub. Date: Mar. 15, 2018

(65) Prior Publication Data
US 2019/0281640 A1    Sep. 12, 2019

(30) Foreign Application Priority Data

Sep. 9, 2016   (JP) .................. 2016-177012

(51) Int. Cl.
*H04W 76/11* (2018.01)
*H04W 76/15* (2018.01)
(Continued)

(52) U.S. Cl.
CPC .............. *H04W 76/11* (2018.02); *H04L 5/005* (2013.01); *H04W 8/26* (2013.01); *H04W 72/12* (2013.01);
(Continued)

(58) Field of Classification Search
CPC ....... H04W 76/11; H04W 76/15; H04W 8/26; H04W 72/1284; H04W 84/12; H04W 74/08; H04W 72/12; H04L 5/005
See application file for complete search history.

(56) References Cited

U.S. PATENT DOCUMENTS

2015/0131640 A1*  5/2015  Seok ............... H04W 28/06
                                                    370/338
2016/0050691 A1*  2/2016  Jauh .............. H04W 74/0808
                                                    370/252
(Continued)

FOREIGN PATENT DOCUMENTS

| JP | 2017-123550 A | 7/2017 | |
| WO | 2015/120488 A1 | 8/2015 | |
| WO | WO-2015120488 A1 * | 8/2015 | .............. H04W 8/26 |

OTHER PUBLICATIONS

EEE 802.11-15/0365r0, "UL MU procedure", Mar. 9, 2015, pp. 1-16.

(Continued)

*Primary Examiner* — Jael M Ulysse
(74) *Attorney, Agent, or Firm* — Sughrue Mion, PLLC (57) ABSTRACT

A wireless LAN system according to the present disclosure includes a wireless LAN base station (AP), and a plurality of wireless LAN terminals (STA) which perform uplink multi-user communication with the wireless LAN base station (AP). An AID indicating an associated wireless LAN terminal (STA) includes a specific bit generated by using a BCB. The wireless LAN base station (AP) and an unassociated wireless LAN terminal (STA) generate a UAID which indicates the unassociated wireless LAN terminal (STA) to include the specific bit or a processed bit obtained by processing the specific bit, and use a bit to be distinguished (Continued)

from the AID as a bit other than the specific bit of the UAID when the specific bit is included in the UAID.

13 Claims, 4 Drawing Sheets

(51) Int. Cl.
| | |
|---|---|
| *H04L 5/00* | (2006.01) |
| *H04W 8/26* | (2009.01) |
| *H04W 72/12* | (2009.01) |
| *H04W 74/08* | (2009.01) |
| *H04W 84/12* | (2009.01) |

(52) U.S. Cl.
CPC ....... *H04W 72/1284* (2013.01); *H04W 74/08* (2013.01); *H04W 74/0808* (2013.01); *H04W 76/15* (2018.02); *H04W 84/12* (2013.01)

(56) References Cited

U.S. PATENT DOCUMENTS

| | | | |
|---|---|---|---|
| 2016/0156438 A1* | 6/2016 | Sun | H04W 72/044 |
| | | | 370/330 |
| 2016/0227533 A1* | 8/2016 | Josiam | H04W 74/006 |
| 2016/0227579 A1* | 8/2016 | Stacey | H04W 74/0833 |
| 2017/0255659 A1* | 9/2017 | Cariou | H04B 7/0413 |

OTHER PUBLICATIONS

IEEE 802.11-15/0132r17, "Specification Framework for TGax", Jan. 28, 2016, p. 1-61.
Chittabrata Ghosh, Random Access with Trigger Frames using OFDMA, IEEE 802.11-15/0875r1, IEEE, Jul. 13, 2015, Slides 1-18.
International Search Report for PCT/JP2017/028867 dated Oct. 24, 2017 [PCT/ISA/210].

* cited by examiner

WIRELESS LAN SYSTEM, WIRELESS LAN BASE STATION, WIRELESS LAN TERMINAL, AND COMMUNICATION METHOD

CROSS REFERENCE TO RELATED APPLICATIONS

This application is a National Stage of International Application No. PCT/JP2017/028867 filed Aug. 9, 2017, claiming priority based on Japanese Patent Application No. 2016-177012 filed Sep. 9, 2016, the entire contents of which are incorporated by reference herein.

TECHNICAL FIELD

The present disclosure relates to a wireless Local Area Network (LAN) system, a wireless LAN base station, a wireless LAN terminal, and a communication method.

BACKGROUND ART

According to wireless LAN standards Institute of Electrical and Electronics Engineers (IEEE) 802.11, a task group TGax is studying a next-generation communication method 802.11ax (HEW: High Efficiency Wireless LAN (WLAN)). With regard to component technologies, the next-generation communication method 802.11ax is expected to adopt a new modulation/demodulation method (1024 Quadrature Amplitude Modulation (QAM)), support uplink Multi User Multi-Input Multi-Output (MU-MIMO) and introduce Orthogonal Frequency-Division Multiple Access (OFDMA).

Figure 1:
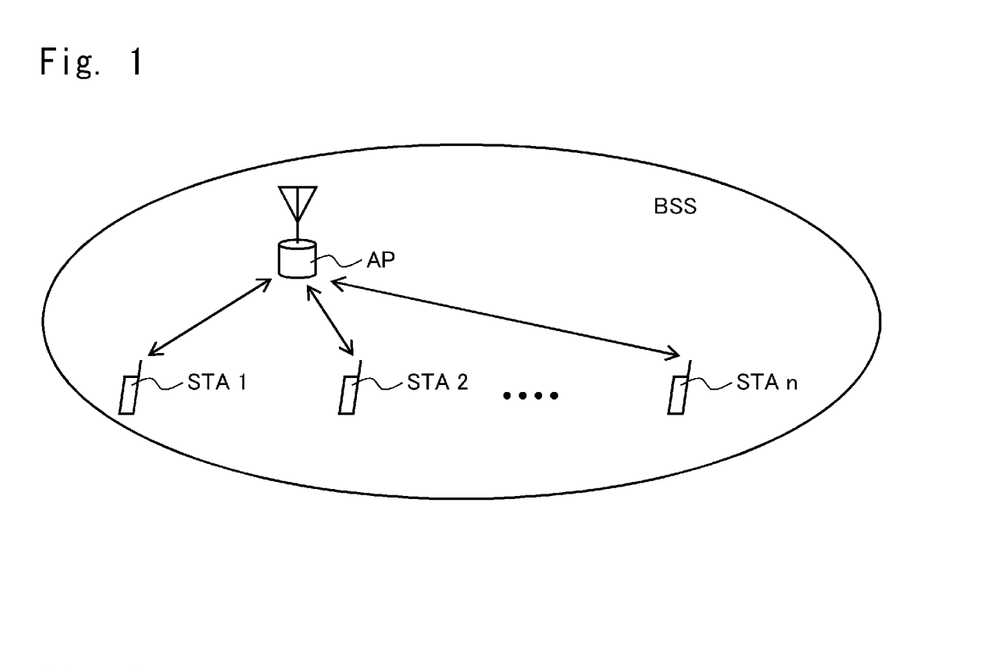
FIG. 1 is a view illustrating a basic configuration example of a wireless LAN system.

FIG. 1 is a view illustrating a basic configuration example of a wireless LAN system. This wireless LAN system includes an access point AP, and a plurality of terminals STA 1 to STA n. In a case where which one of the terminals STA 1 to STA n is not specified, the terminal will be referred to as a terminal STA below. In addition, FIG. 1 assumes that there are the three or more terminals STAs, yet is not limited to this. When single user communication is performed, the number of the terminal STA may be one (i.e., n is one), and when multi-user communication is performed, the number of the terminals STAs may be two or more (i.e., n is two or more). The access point AP and the terminals STA 1 to STA n form a network called a Basic Service Set (BSS).

In a case of uplink OFDMA introduced in IEEE 802.11ax (HEW) or UpLink Multi-User (UL MU) communication of uplink MU-MIMO, the access point AP performs centralized control of a plurality of terminals STAs, divides communication resources into a plurality of Resource Units (RUs), and allocates the resource units to a plurality of terminals STAs. Consequently, a plurality of terminals STAs can simultaneously perform communication.

A procedure of uplink multi-user communication will be briefly described (see Non-Patent Literature 1). When there is uplink data which waits to be transmitted, the terminal STA notifies in advance the access point AP of a buffer status indicating that there is the uplink data. The access point AP transmits a trigger frame for allocating resource units RUs, to a plurality of terminals STAs in the BSS. In this case, the access point AP includes, in the trigger frame, information of the resource units RUs and terminal Identifier(s) (ID(s)) (e.g., Association ID(s) (AID(s))) for designating the terminal(s) STA(s) to which the resource units RUs are allocated. In addition, the AID is an ID which is uniquely generated by the access point AP to manage the terminal STA associated with the access point AP and is unique to the terminal STA.

However, even when the unassociated terminal STA and the terminal STA which has already been associated yet has woken up from sleep immediately before, have uplink data which waits to be transmitted, the access point AP cannot learn the presence of the uplink data. Therefore, the access point AP cannot allocate the resource units RUs to these terminals STAs. Hence, UL OFDMA-based random access is introduced, and these terminals STAs can perform uplink data transmission (see clause 4.5 of Non-Patent Literature 2).

Figure 2:
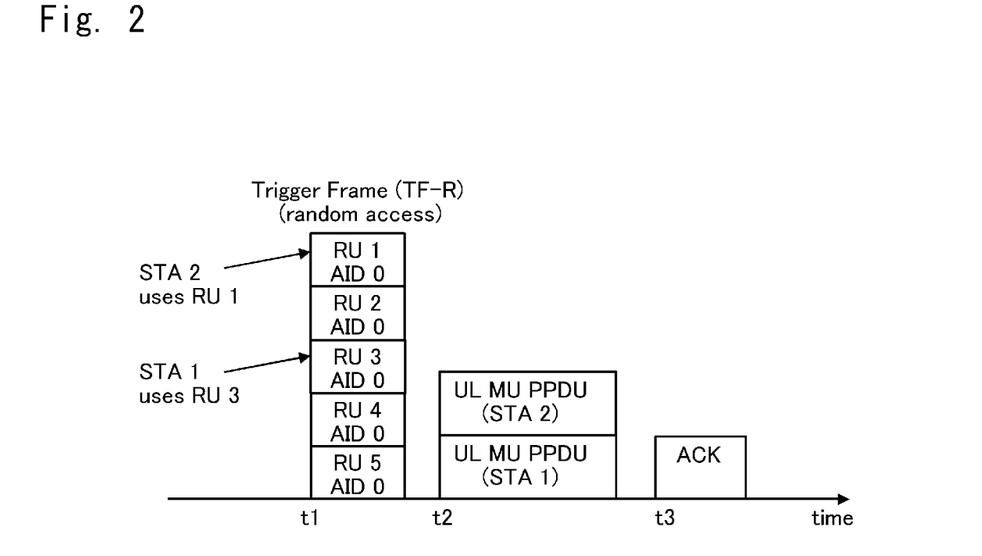
FIG. 2 is a view for explaining a procedure of OFDMA-based random access.

A procedure of OFDMA-based random access will be described with reference to FIG. 2. In this regard, at least the terminals STA 1 and STA 2 exist in the BSS.

Procedure 1:

The terminal STA which has uplink data which waits to be transmitted sets an initial value to an OFDMA Back-Off (OBO) counter of the terminal STA. A value within a range from 0 to an OFDM Contention Window (OCW) is randomly selected for the initial value.

Procedure 2:

The access point AP transmits a Trigger Frame for Random access (TF-R) for allocating the resource units RUs, to a plurality of terminals STAs in the BSS (time t1). In this regard, the access point AP notifies five resource units RU 1 to RU 5. Further, the access point AP does not allocate the resource units RU 1 to RU 5 to the specific terminals STAs, and sets the resource units RU 1 to RU 5 as the resource units RUs for random access. Hence, the access point AP includes, in the trigger frame for random access, information of the resource units RU 1 to RU 5, a special terminal ID (an AID 0 in an example in FIG. 2) indicating that random access can be made to each of the resource units RU 1 to RU 5. The terminal STA whose count value of the OBO counter is not 0 decrements the count value per predetermined time by five which is the number of the resource units RU 1 to RU 5 for which the special terminal ID has been designated. As a result, the terminal STA whose count value has become 0 selects one of the resource units RUs, and uses the selected resource unit RU to transmit a UL MU Physical Layer Convergence Protocol (PLCP) Protocol Data Unit (PPDU) frame including uplink data to the access point AP (time t2). In this regard, the terminal STA 2 transmits uplink data by using the resource unit RU 1, and the terminal STA 1 transmits uplink data by using the resource unit RU 3.

Procedure 3:

The access point AP transmits ACKnowledgement (ACK) frame(s) for notifying whether or not communication of the UL MU PPDU frame at the time t2 succeeds, to a plurality of terminals STAs in the BSS (time t3). In a case where the terminal STA has not been able to correctly transmit uplink data due to collision, the terminal STA can decide that the uplink data has not been able to be transmitted by checking the ACK frame. Hence, the terminal STA which has not been able to correctly transmit the uplink data returns to the procedure 1, sets a random initial value within the range from 0 to the OCW to the OBO counter again, and waits for an occasion to retransmit the uplink data.

However, the unassociated terminal STA does not have the AID, and therefore the access point AP cannot include the AID in the ACK frame to notify the unassociated terminal STA of whether or not communication succeeds. Furthermore, when the unassociated terminal STA can join only random access, a state of low communication efficiency continues until the terminal STA is associated. Hence, it is considered to designate the unassociated terminal STA by a temporary terminal ID (e.g., an Unassociation ID (UAID)).

Figure 3:
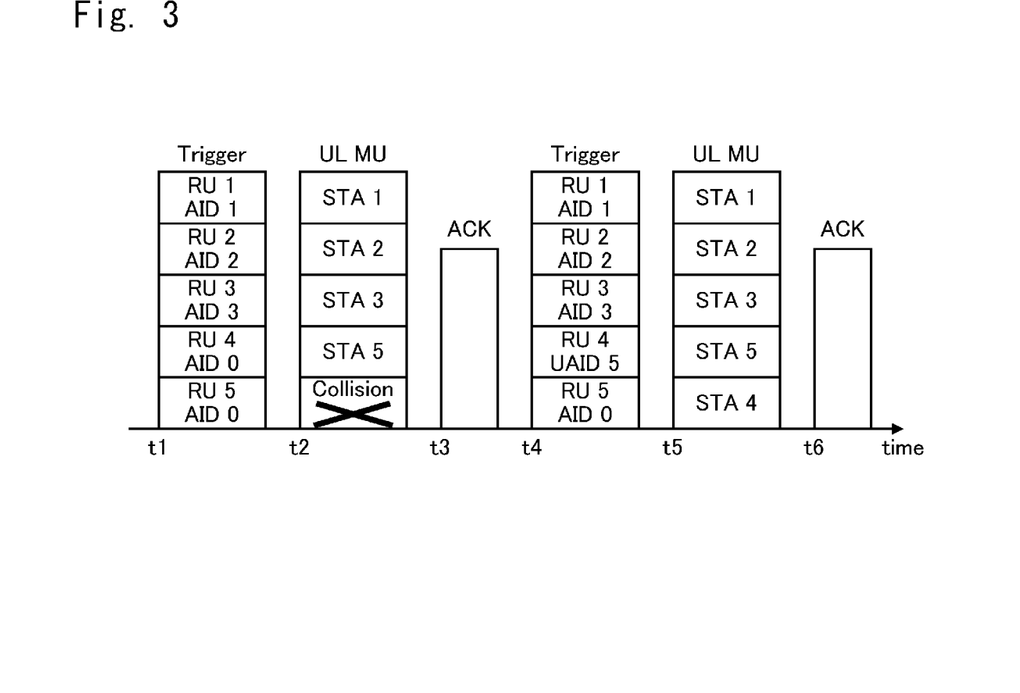
FIG. 3 is a view for explaining an example of a temporary UAID which designates an unassociated terminal.

FIG. 3 is a view for explaining an example of the temporary UAID for designating the unassociated terminal STA. In this case, there are at least the associated terminals STA 1 to STA 3, and unassociated terminals STA 4 and STA 5 in the BSS, and an AID 1 to an AID 3 are set as terminal IDs to the associated terminals STA 1 to STA 3, respectively.

At the time t1, the access point AP transmits the trigger frame for notifying the resource units RUs, to a plurality of terminals STAs in the BSS. In this regard, the access point AP notifies the five resource units RU 1 to RU 5. Further, the access point AP allocates the resource units RU 1 to RU 3 to the associated terminals STA 1 to STA 3, respectively, yet does not allocate the resource units RU 4 and RU 5 to the specific terminals STAs and sets the resource units RU 4 and RU 5 as the resource units RUs for random access. Hence, the access point AP includes, in the trigger frame at the time t1, information of the resource units RU 1 to RU 5, the AID 1 to the AID 3 for designating the terminals STA 1 to STA 3 to which the resource units RU 1 to RU 3 are allocated, and an AID 0 which is a special value indicating that the resource units RU 4 and RU 5 are the resource units RUs for random access.

At the time t2, the terminals STA 1 to STA 3 designated by the AID 1 to the AID 3 transmit the UL MU PPDU frames including uplink data to the access point AP by using the resource units RU 1 to RU 3, respectively, allocated to the terminals STA 1 to STA 3. Further, the terminal STA 5 accesses the resource unit RU 4 for random access, obtains an access right to the resource unit RU 4, and transmits the UL MU PPDU frame including uplink data to the access point AP by using the resource unit RU 4. On the other hand, regarding the resource unit RU 5, since collision of the uplink data occurs, successful communication cannot be performed. Thus, the two resource units RU 4 and RU 5 are likely to cause collision of the uplink data in the UL MU PPDU frame at the time t2, and therefore communication efficiency is low.

At the time t3, the access point AP transmits the ACK frames for notifying whether or not communication of the UL MU PPDU frames at the time t2 succeeds, to a plurality of terminals STAs in the BSS.

At the time t4, the access point AP transmits the trigger frame for notifying the resource units RUs, to a plurality of terminals STAs in the BSS. In this regard, the access point AP notifies the five resource units RU 1 to RU 5. Further, the access point AP allocates the resource units RU 1 to RU 3 to the associated terminals STA 1 to STA 3, respectively, and does not allocate the resource unit RU 5 to the specific terminal STA and sets the resource unit RU 5 as the resource unit RU for random access. Further, the access point AP allocates the resource unit RU 4 to the unassociated terminal STA 5, and designates the unassociated terminal STA 5 by a temporary UAID 5. The UAID 5 is designed such that values independently generated by the access point AP and the terminal STA 5 match. For example, the access point AP and the terminal STA 5 process a Media Access Control (MAC) address of the terminal STA 5 by a predetermined process, and generate the UAID 5 such that the UAID 5 fits in an information element (12 bits) for storing the AID in the trigger frame. In this regard, the access point AP and the terminal STA 5 need to generate the UAID 5 such that the UAID 5 can be distinguished from a normal AID value. When the terminal STA 5 is associated and the AID value is set to the terminal STA 5, the access point AP and the terminal STA 5 delete the UAID 5, and finish managing the UAID 5.

As described above, the access point AP includes, in the trigger frame at the time t4, the information of the resource units RU 1 to RU 5, the AID 1 to the AID 3 for designating the terminals STA 1 to STA 3 to which the resource units RU 1 to RU 3 are allocated, the temporary UAID 5 for designating the terminal STA 5 to which the resource unit RU 4 is allocated, and the AID 0 which is a special value indicating that the resource unit RU 5 is the resource unit RU for random access.

At the time t5, the terminals STA 1 to STA 3 designated by the AID 1 to the AID 3 transmit the UL MU PPDU frames including the uplink data to the access point AP by using the resource units RU 1 to RU 3, respectively, allocated to the terminals STA 1 to STA 3. Further, the terminal STA 5 designated by the UAID 5 transmits the UL MU PPDU frame including the uplink data to the access point AP by using the resource unit RU 4 allocated to the terminal STA 5. Further, the terminal STA 4 accesses the resource unit RU 5, obtains the access right to the resource unit RU 5, and transmits the UL MU PPDU frame including the uplink data to the access point AP by using the resource unit RU 5. Thus, only the resource unit RU 5 is likely to collision of the uplink data in the UL MU PPDU frame at the time t5, so that communication efficiency improves.

At the time t6, the access point AP transmits ACK frames for notifying whether or not communication of the UL MU PPDU frames at the time t5 succeeds, to a plurality of terminals STAs in the BSS.

CITATION LIST

Non Patent Literature

NPL 1: IEEE 802.11-15/0365r0, "UL MU procedure", 2015 Mar. 9

NPL 2: IEEE 802.11-15/0132r17, "Specification Framework for TGax", 2016 Jan. 28

SUMMARY OF INVENTION

Technical Problem

However, when a temporary UAID for designating the unassociated terminal STA is used, the following two problems need to be taken into account.

(1) Reduction of Likelihood of Conflict Between UAID and AID

The AID is an ID which is used by the access point AP to manage the associated terminal STA, and is unique to the terminal STA. Hence, the UAID needs to be a unique ID which does not overlap (referred to conflict below) the AID. If the UAID conflicts with the AID, the access point AP cannot distinguish between the two conflicting terminals STAs. Therefore, for example, an ACK frame transmitted by the access point AP is likely to be erroneously received.

(2) Reduction of Likelihood of Conflict Between UAIDs

The UAID is desirably an ID which does not cause conflict between a plurality of terminals STAs and is unique to the terminal STA. The AID is an ID which is uniquely generated by the access point AP, and therefore does not cause conflict between a plurality of terminals STAs. However, the UAID is the ID which is independently generated by each unassociated terminal STA, and therefore it is likely to cause conflict between a plurality of terminals STAs. When, for example, the UAID is generated from the MAC address, while the MAC address is unique to the terminal STA and is a 48 bit number, the UAID is a 12 bit number.

Therefore, the same UAID is likely to be generated from different MAC addresses. In this case, for example, the unassociated terminal STA is likely to erroneously recognize the ACK frame for this unassociated terminal STA as an ACK frame for the another terminal STA.

It is therefore one of objects of the present disclosure to provide a wireless LAN system, a wireless LAN base station, a wireless LAN terminal and a communication method which can solve a problem to reduce a likelihood of occurrence of conflict of a UAID.

Solution to Problem

According to one aspect, a wireless local area network (LAN) system includes: a wireless LAN base station; and a plurality of wireless LAN terminals configured to perform uplink multi-user communication with the wireless LAN base station, and an association identifier (AID) indicating an associated wireless LAN terminal includes a specific bit generated by using a basic service set (BSS) color bit (BCB), and the wireless LAN base station and an unassociated wireless LAN terminal generate an unassociation identifier (UAID) indicating the unassociated wireless LAN terminal to include the specific bit or a processed bit obtained by processing the specific bit, and use a bit to be distinguished from the AID as a bit other than the specific bit of the UAID when the specific bit is included in the UAID.

According to another aspect, a wireless local area network (LAN) system includes: a wireless LAN base station; and a plurality of wireless LAN terminals configured to perform uplink multi-user communication with the wireless LAN base station, and the wireless LAN base station transmits a trigger frame to the plurality of wireless LAN terminals, the trigger frame including information and a base value, the information indicating a resource unit for random access, and the base value being a signaling parameter of an unassociation identifier (UAID) indicating an unassociated wireless LAN terminal, the unassociated wireless LAN terminal generates the UAID by using the base value of the UAID included in the trigger frame, and information indicating an order of a resource unit for random access among resource units for random access, the resource unit for random access being indicated by the information included in the trigger frame, and transmits uplink data to the wireless LAN base station by using the resource unit for random access indicated by the information included in the trigger frame, and the wireless LAN base station generates the UAID by using the base value of the UAID and the information indicating the order of the resource unit for random access among the resource units for random access, the resource unit for random access being used to transmit the uplink data.

According to one aspect, a wireless local area network (LAN) base station is a wireless LAN base station configured to perform uplink multi-user communication with a plurality of wireless LAN terminals, and includes: a memory configured to store a command; and at least one processor configured to process the command, and an association identifier (AID) indicating an associated wireless LAN terminal includes a specific bit generated by using a basic service set (BSS) color bit (BCB), and the processor generates an unassociation identifier (UAID) indicating the unassociated wireless LAN terminal to include the specific bit or a processed bit obtained by processing the specific bit, and uses a bit to be distinguished from the AID as a bit other than the specific bit of the UAID when the specific bit is included in the UAID.

According to another aspect, a wireless local area network (LAN) base station is a wireless LAN base station configured to perform uplink multi-user communication with a plurality of wireless LAN terminals, and includes: a memory configured to store a command; and at least one processor configured to process the command, and the processor transmits a trigger frame to the plurality of wireless LAN terminals, the trigger frame including information and a base value, the information indicating a resource unit for random access, and the base value being a signaling parameter of an unassociation identifier (UAID) indicating an unassociated wireless LAN terminal, receives uplink data from the unassociated wireless LAN terminal, the uplink data being transmitted by using the resource unit for random access indicated by the information included in the trigger frame, and generates the UAID by using the base value of the UAID and the information indicating an order of the resource unit for random access among resource units for random access, the resource unit for random access being used to transmit the uplink data.

According to one aspect, a wireless local area network (LAN) terminal is a wireless LAN terminal of a plurality of wireless LAN terminals configured to perform uplink multi-user communication with the wireless LAN base station, and includes: a memory configured to store a command; and at least one processor configured to process the command, and an association identifier (AID) indicating an associated wireless LAN terminal includes a specific bit generated by using a basic service set (BSS) color bit (BCB), and the processor generates an unassociation identifier (UAID) indicating the wireless LAN terminal to include the specific bit or a processed bit obtained by processing the specific bit when the wireless LAN terminal is an unassociated wireless LAN terminal, and uses a bit to be distinguished from the AID as a bit other than the specific bit of the UAID when the wireless LAN terminal is the unassociated wireless LAN terminal and the specific bit is included in the UAID.

According to another aspect, a wireless local area network (LAN) terminal is a wireless LAN terminal of a plurality of wireless LAN terminals configured to perform uplink multi-user communication with the wireless LAN base station, and includes: a memory configured to store a command; and at least one processor configured to process the command, and the processor receives a trigger frame from the wireless LAN base station, the trigger frame including information and a base value, the information indicating a resource unit for random access, and the base value being a signaling parameter of an unassociation identifier (UAID) indicating an unassociated wireless LAN terminal, generates the UAID indicating the wireless LAN terminal by using the base value of the UAID included in the trigger frame, and information indicating an order of a resource unit for random access among resource units for random access when the wireless LAN terminal is the unassociated wireless LAN terminal, the resource unit for random access being indicated by the information included in the trigger frame, and transmits uplink data to the wireless LAN base station by using the resource unit for random access indicated by the information included in the trigger frame when the wireless LAN terminal is the unassociated wireless LAN terminal.

According to one aspect, a communication method is a communication method of a wireless local area network (LAN) base station configured to perform uplink multi-user communication with a plurality of wireless LAN terminals, and an association identifier (AID) indicating an associated wireless LAN terminal includes a specific bit generated by using a basic service set (BSS) color bit (BCB), and the communication method includes: generating an unassociation identifier (UAID) indicating the unassociated wireless LAN terminal to include the specific bit or a processed bit obtained by processing the specific bit, and using a bit to be distinguished from the AID as a bit other than the specific bit of the UAID when the specific bit is included in the UAID.

According to another aspect, a communication method is a communication method of a wireless local area network (LAN) base station configured to perform uplink multi-user communication with a plurality of wireless LAN terminals, and includes: transmitting a trigger frame to the plurality of wireless LAN terminals, the trigger frame including information and a base value, the information indicating a resource unit for random access, and the base value being a signaling parameter of an unassociation identifier (UAID) indicating an unassociated wireless LAN terminal; receiving uplink data from the unassociated wireless LAN terminal, the uplink data being transmitted by using the resource unit for random access indicated by the information included in the trigger frame; and generating the UAID by using the base value of the UAID and the information indicating the order of the resource unit for random access among resource units for random access, the resource unit for random access being used to transmit the uplink data.

According to still another aspect, a communication method is a communication method of a wireless local area network (LAN) terminal of a plurality of wireless LAN terminals configured to perform uplink multi-user communication with the wireless LAN base station, and an association identifier (AID) indicating an associated wireless LAN terminal includes a specific bit generated by using a basic service set (BSS) color bit (BCB), and the communication method includes: generating an unassociation identifier (UAID) indicating the wireless LAN terminal to include the specific bit or a processed bit obtained by processing the specific bit when the wireless LAN terminal is an unassociated wireless LAN terminal; and using a bit to be distinguished from the AID as a bit other than the specific bit of the UAID when the wireless LAN terminal is the unassociated wireless LAN terminal and the specific bit is included in the UAID.

According to yet still another aspect, a communication method is a communication method of a wireless local area network (LAN) terminal of a plurality of wireless LAN terminals configured to perform uplink multi-user communication with the wireless LAN base station, and includes: receiving a trigger frame from the wireless LAN base station, the trigger frame including information and a base value, the information indicating a resource unit for random access, and the base value being a signaling parameter of an unassociation identifier (UAID) indicating an unassociated wireless LAN terminal; generating the UAID indicating the wireless LAN terminal by using the base value of the UAID included in the trigger frame, and information indicating an order of a resource unit for random access among resource units for random access when the wireless LAN terminal is the unassociated wireless LAN terminal, the resource unit for random access being indicated by the information included in the trigger frame; and transmitting uplink data to the wireless LAN base station by using the resource unit for random access indicated by the information included in the trigger frame when the wireless LAN terminal is the unassociated wireless LAN terminal.

Advantageous Effects of Invention

According to the above aspect, it is possible to obtain an effect that it is possible to reduce a likelihood of occurrence of conflict of a UAID.

DESCRIPTION OF EMBODIMENTS

Examples of the present disclosure will be described below with reference to the drawings. A configuration of a wireless LAN system according to each example described below is the same as the basic configuration illustrated in FIG. 1, and includes an access point AP and terminals STA 1 to STA n. The access point AP is one example of a wireless LAN base station, and the terminals STA 1 to STA n are one example of wireless LAN terminals.

(1) First Example

According to the first example, a likelihood of conflict between a UAID and an AID is reduced.

According to the IEEE 802.11ax standards, when generating an AID of a terminal STA, an access point AP generates each bit from (8-N) bit to eight bit of the AID by using a BSS Color Bit (BCB) according to the following special function, and arbitrarily determines other bits. For ease of description, each bit from the (8-N) bit to the eight bit of the AID will be referred to as a BCB AID bit.

$$AID(8-N+1:8)=\text{bin}[(\text{dec}(BCB(0:N-1))+\text{dec}(BSSID(47-N+1:47)\oplus BSSID(43-N+1:43))) \bmod 2^N, N] \quad [\text{Mathematical 1}]$$

Figure 4:
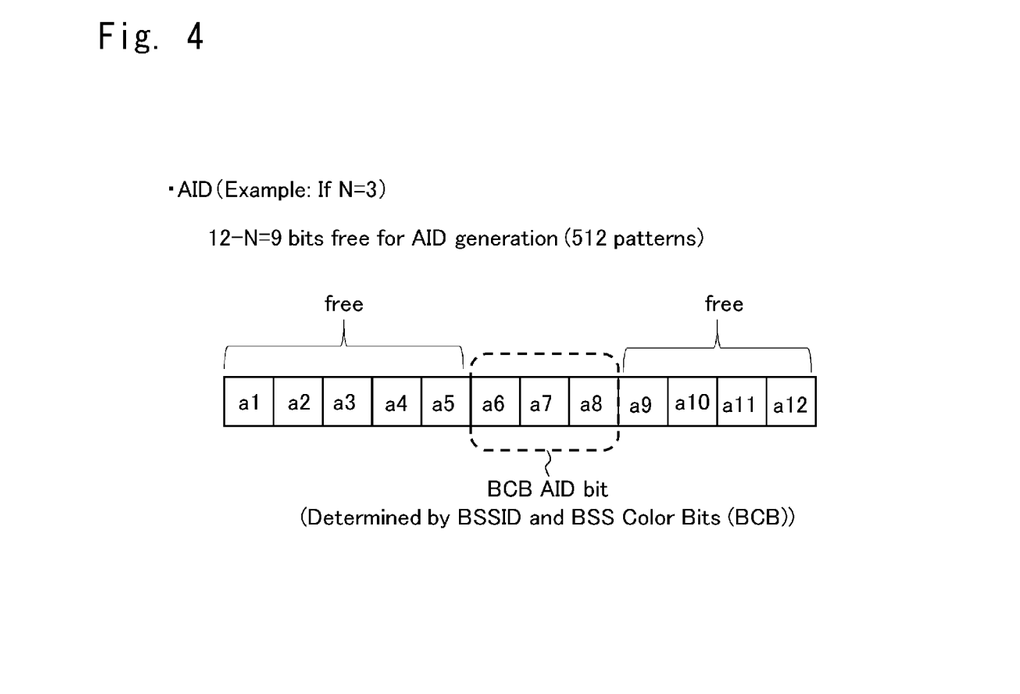
FIG. 4 is a view for explaining a structure example of an AID for designating an associated terminal.

In this regard, above N is an arbitrary integer within a range from one to seven. FIG. 4 is a view illustrating a structure example of the AID in a case of N=3. In the case of N=3, lower three bits a6 to a8 of the AID from the eighth bit are determined by BSS IDs and BCBs, and the rest of nine bits a1 to a5 and a9 to a12 are arbitrarily determined. Hence, 512 patterns of the AID can be set.

Generation of the AID described above relates to a Partial AID adopted in the IEEE 802.11ac standards, and the Partial AID enables power saving in a PHY layer (physical layer).

According to the IEEE 802.11ac standards, a VHT-SIG-A field of a PHY frame includes information of the Partial AID, and decision is made in a PHY layer level based on the Partial AID not to receive data in the PHY frame irrelevant to the Partial AID to contribute to power saving. On the other hand, according to the IEEE 802.11ax standards, an HE-SIG-A field of the PHY frame includes BCB information instead of the Partial AID, and decision is made in the PHY layer level based on the BCB not to receive data in the PHY frame irrelevant to the BCB to contribute to power saving. In this case, backward compatibility needs to be taken into account. For example, the Partial AID is generated from the BSS IDs and the lower eight bits of the AID, and the AID generated based on the IEEE802.11ax standards includes BCB AID bits. By this means, the generated Partial AID is designed to include the BCBs. Hence, the Partial AID generated as described above contributes to power saving for both of the terminals STAs according to the IEEE 802.11ac standards and the terminals STAs according to the IEEE 802.11ax standards.

In addition, a Partial AID generating method is not limited to the above, and differs according to conditions such as a frame type. Details of the Partial AID generating method is disclosed on pp. 145 of the following Non-Patent Literature.

IEEE Std 802.11ac (TM)-2013, IEEE Standard for Information technology-Telecommunications and information exchange between systems Local and metropolitan area networks—Specific requirements, Part 11: Wireless LAN Medium Access Control (MAC) and Physical Layer (PHY) Specifications, December 2013

According to the first example, the access point AP and the unassociated terminal STA generate the UAID by using the BCB AID bits generated from the BCBs. That is, when the UAID is generated, each bit from (8-N) bit to eight bit of the UAID is determined by using a BCB AID bit, and other bits are arbitrarily determined. Consequently, it is possible to expect that the Partial AID generated from the UAID provides the same effect of power saving as that of the Partial AID generated from the AID.

In addition, as a method of the terminal STA for obtaining the BCB, for example, both of the associated terminal STA and the unassociated terminal STA can obtain BCB information in advance from a frame transmitted by the access point AP.

Further, according to the first example, the access point AP and the unassociated terminal STA generate the UAID such that the UAID does not conflict with the AID by using the following methods.

Method A

Figure 5:
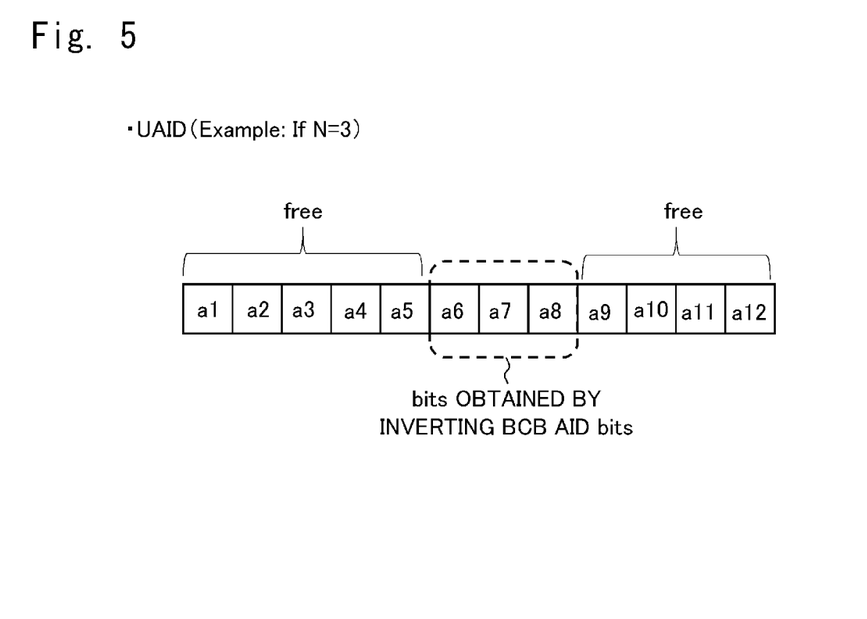
FIG. 5 is a view for explaining a structure example of the temporary UAID for designating the unassociated terminal according to a first example.

The method A is a method for using bits obtained by inverting the BCB AID bits of the AID as BCB AID bits for the UAID. That is, in the case of N=3, for example, as illustrated in FIG. 5, portions of the bits a6 to a8 of the UAID are bits obtained by inverting the BCB AID bits of the AID. Consequently, it is possible to prevent the generated UAID from conflicting with the AID.

Method B

The method B is a method for using the BCB AID bits of the AID as the BCB AID bits of the UAID, and using other bits of the UAID as bits which can be distinguished from those of the AID. That is, in the case of N=3, for example, the BCB AID bits of the AID are used as is for the portions of the bits a6 to a8 of the UAID in FIG. 4, and the portions of the other bits a1 to a5 and a9 to a12 of the UAID are bits which can be distinguished from those of the AID. When, for example, a value of 1 to 16 can be used for a certain information element which uses part of the bits a1 to a5, a value within a range of 1 to 8 is used for the AID, and a value within a range of 9 to 16 is used for the UAID to make it possible to distinguish between the AID and the UAID based on the value ranges. Consequently, it is possible to prevent the generated UAID from conflicting with the AID.

Method C

The method C is a method which is a combination of the above method A and method B. That is, in the case of N=3, for example, not only the portions of the bits a6 to a8 of the UAID are distinguished from those of the AID, but also the portions of the other bits a1 to a5 and a9 to a12 of the UAID are also distinguished from those of the AID.

As described above, according to the first example, the access point AP and the unassociated terminal STA generate the UAID such that the UAID does not conflict with the AID by using the BCB AID bits. Consequently, it is possible to obtain the same UAID value in both of the access point AP and the unassociated terminal STA while obtaining the effect of power saving, and avoid conflict between the UAID and the AID. Consequently, it is possible to reduce a likelihood that an ACK frame transmitted by the access point AP is erroneously received.

In addition, the above method A processes the BCB AID bits of the UAID to bits obtained by inverting the BCB AID bits of the AID, yet is not limited to this. So long as the BCB AID bits of the UAID are processed as a different bit sequence from AID bits used for the AID so as to be distinguishable from those of the AID, the BCB AID bits of the AID may be processed by other methods. For example, bits obtained by adding a predetermined value to the BCB AID bits of the AID, subtracting the predetermined value from the BCB AID bits, multiplying the BCB AID bits with the predetermined value, or dividing the BCB AID bits by the predetermined value may be the BCB AID bits for the UAID. In addition, multiplication and division of bits include bit shift, too.

(2) Second Example

According to the second example, a likelihood of conflict between UAIDs is reduced.

(2-1) Generation of UAID

According to the second example, an access point AP and an unassociated terminal STA generate the UAID by using the following methods such that UAIDs do not conflict.

Method a

According to the method a, the unassociated terminal STA generates the UAID by using signaling of a trigger frame transmitted from the access point AP. The method a and a base value B of the UAID which is a signaling parameter will be described below with reference to FIG. 6. In this regard, there are at least unassociated terminals STA 1 and STA 2 in a BSS.

Figure 6:
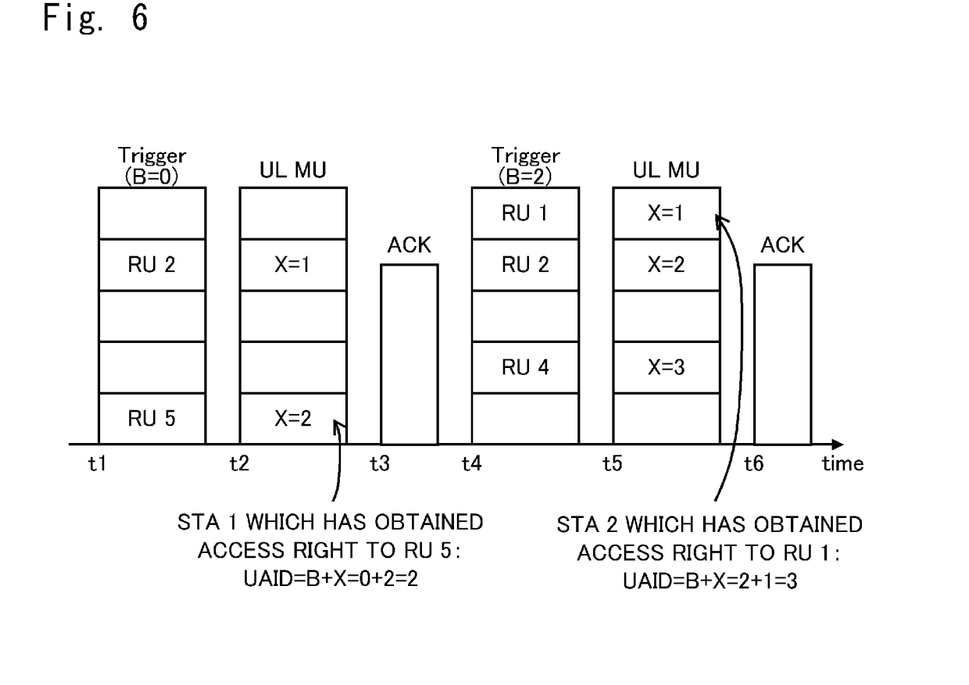
FIG. 6 is a view for explaining an example of a method for generating the temporary UAID for designating the unassociated terminal according to a second example.

At the time t1, the access point AP transmits a trigger frame for notifying resource units RUs, to a plurality of terminals STAs in the BSS. In this regard, the access point AP notifies five resource units RU 1 to RU 5. Further, the second and fifth resource units RU 2 and RU 5 are resource units random RUs for random access, and the other resource units RU 1, RU 3 and RU 4 are resource units RUs to be allocated to the specific terminals STAs. Hence, the access point AP includes, in the trigger frame at the time t1, information of the resource units RU 1 to RU 5, AID values for designating the specific terminals STAs to which the resource units RU 1, RU 3 and RU 4 are respectively allocated, special values indicating that the resource units RU 2 and RU 5 are the resource units RUs for random access, and the base value B of the UAID. In this regard, the base value B of the UAID is B=0 as an initial value.

At the time t2, the unassociated terminal STA 1 in the BSS obtains an access right to, for example, the fifth resource unit RU 5 to join random access of the trigger frame at the time t1. The terminal STA 1 generates the UAID by using a value X indicating an order of the resource unit RU 5 among the resource units RUs for random access designated by the trigger frame at the time t1, and the base value B of the UAID. In this regard, the resource unit RU 5 is the second one among the resource units RUs for random access designated by the trigger frame at the time t1, and therefore X=2 holds. Further, in this case, the base value B of the UAID notified by the trigger frame at the time t1 is B=0. Hence, the terminal STA 1 calculates UAID=B+X=0+2=2, and determines 2 which is the resulting value as the UAID of the terminal STA 1. Further, the terminal STA 1 transmits a UL MU PPDU frame including uplink data to the access point AP by using the resource unit RU 5.

On the other hand, when receiving the UL MU PPDU frame at the time t2, the access point AP can learn that the terminal STA (terminal STA 1) which is a transmission source of this UL MU PPDU frame has transmitted the UL MU PPDU frame by using the resource unit RU 5, and therefore a value of X=2 can be obtained. Further, the access point AP notifies the base value B=0 of the UAID by the trigger frame transmitted at the time t1 by the access point AP. Hence, by calculating UAID=B+X=0+2=2 by using X=2 and B=0, the access point AP can obtain 2 as a UAID value for designating the terminal STA (terminal STA 1) which is the transmission source of the UL MU PPDU frame at the time t2.

At the time t3, the access point AP transmits an ACK frame for notifying whether or not communication of the UL MU PPDU frame at the time t2 succeeds, to a plurality of terminals STAs in the BSS. In this case, a UAID 2 for designating the terminal STA 1 is included in the ACK frame, so that it is possible to notify the terminal STA 1 of whether or not communication of the UL MU PPDU frame at the time t2 succeeds. Consequently, it is possible to reduce the likelihood that the terminal STA 1 erroneously recognizes the ACK frame for the terminal STA 1 as the ACK frame for the another terminal STA.

At the time t4, the access point AP transmits a trigger frame for notifying the resource units RUs, to a plurality of terminals STAs in the BSS. In this regard, the access point AP notifies the five resource units RU 1 to RU 5. Further, the first, second and fourth resource units RU 1, RU 2 and RU 4 are the resource units RUs for random access, and the other resource units RU 3 and RU 5 are the resource units RUs which are allocated to the specific terminals STAs. Hence, the access point AP includes, in the trigger frame at the time t4, the information of the resource units RU 1 to RU 5, the AID values for designating the specific terminals STAs to which the resource units RU 3 and RU 5 are respectively allocated, the special values indicating that the resource units RU 1, RU 2 and RU 4 are the resource units RUs for random access, and the base value B of the UAID. In this regard, the base value B of the UAID is changed to B=2. This is because the number of the resource units RUs for random access is two in the trigger frame at the previous time t1, and therefore the base value B of the previous UAID has been incremented by 2. In this regard, any value may be used for B as long as B is a value which can reduce the likelihood of conflict between UAID values.

At the time t5, the unassociated terminal STA 2 in the BSS obtains an access right to, for example, the first resource unit RU 1 to join random access in the trigger frame at the time t4. In this regard, the resource unit RU 1 is the first one among the resource units RUs for random access designated by the trigger frame at the time t4, and therefore X=1 holds. Further, in this case, the base value B of the UAID notified by the trigger frame at the time t4 is B=2. Hence, the terminal STA 2 calculates UAID=B+X=2+1=3 and determines 3 which is the resulting value as the UAID of the terminal STA 2. Further, the terminal STA 2 transmits the UL MU PPDU frame including uplink data to the access point AP by using the resource unit RU 1.

On the other hand, when receiving the UL MU PPDU frame at the time t5, the access point AP can obtain the value of X=1. Further, the access point AP notifies the base value B=2 of the UAID by the trigger frame transmitted at the time t4 by the access point AP. Consequently, by calculating UAID=B+X=2+1=3, the access point AP can obtain 3 as the UAID value for designating the terminal STA (terminal STA 2) which is the transmission source of the UL MU PPDU frame at the time t5.

At the time t6, the access point AP transmits the ACK frame for notifying whether or not communication of the UL MU PPDU frame at the time t5 succeeds, to a plurality of terminals STAs in the BSS. In this case, by including in the ACK frame a UAID 3 for designating the terminal STA 2, it is possible to notify the terminal STA 2 of whether or not communication of the UL MU PPDU frame at the time t5 succeeds. Consequently, it is possible to reduce a likelihood that the terminal STA 2 erroneously recognizes the ACK frame for the terminal STA 2 as an ACK frame for the another terminal STA.

As described above, according to the method a of the second example, the access point AP and the unassociated terminal STA calculate the UAID from the value (X) indicating the order of the resource unit RU for random access for which this terminal STA has obtained an access right among the resource units RUs for random access designated by the trigger frame, and the base value (B) of the UAID. Consequently, both of the access point AP and the unassociated terminal STA can obtain the same UAID value, and avoid conflict between the UAIDs. Further, by appropriately incrementing the base value (B) of the UAID, the access point AP can avoid conflict between UAIDs even in a scene that a next trigger frame is transmitted. Consequently, the access point AP can transmit an ACK frame by using the UAID, so that it is possible to reduce the likelihood that the unassociated terminal STA erroneously recognizes the ACK frame for the unassociated terminal STA as an ACK frame for the another terminal STA.

In addition, according to the method a, the base value B of the UAID may return to 0 when exceeding the maximum number, and then be incremented. By giving to the base value B of the UAID a bit sequence which can take a sufficiently larger value than the number of terminals STAs which are likely to simultaneously join random access, this method a reduces the likelihood that UAID values conflict.

Further, according to the method a, the same terminal STA generates a new UAID value every time this terminal STA joins random access, and therefore the AP and the UAID need to determine which STA to use. For example, the UAID value of this terminal STA may be overwritten by a new UAID value at all times. By so doing, it is possible to not only transmit an ACK frame by using the UAID value, but also join uplink multi-user communication which is not UL OFDM-based random access.

Method b

According to the method b, the access point AP and the unassociated terminal STA generate a UAID by using information held by this terminal STA. In addition, when the unassociated terminal STA obtains information in advance from the access point AP by means of other than a trigger frame, this information is handled as information held by this terminal STA.

For example, the access point AP and the unassociated terminal STA process an MAC address of this terminal STA by a predetermined process, and generate the UAID such that the UAID fits in an information element (12 bits) for containing an AID in the trigger frame.

As described above, according to the method b of the second example, the access point AP and the unassociated terminal STA generate the UAID of this terminal STA by using the MAC address of this terminal STA. The MAC address is unique to the terminal STA, and therefore it is less likely to cause conflict between UAIDs. However, while the MAC address is a 48 bit number, the UAID is a 12 bit number, and therefore the same UAID is generated from different MAC addresses, and the UAIDs are also likely to conflict. In this case, recovery processing described below needs to be performed.

(2-1) Recovery in Case where UAIDs Conflict

According to the second example, the access point AP and the unassociated terminal STA generate a UAID by using the above method a or method b such that UAIDs do not conflict. However, the UAID is an ID which is independently generated by each unassociated terminal STA, and therefore it is not less likely to cause conflict between UAIDs of a plurality of terminals STA.

Hence, the second example assumes that the UAIDs conflict between a plurality of terminals STAs, and, when the UAIDs conflict, processing of recovering the conflict between the UAIDs is performed.

For example, the two unassociated terminals STAs (compliant with IEEE 802.11ax) independently generate UAIDs and join uplink multi-user communication of OFDMA-based random access. In this case, the access point AP also generates the two UAIDs for the respective two unassociated terminals STAs. In this regard, it is assumed that the access point AP has detected conflict between the two UAIDs. In this case, the access point AP decides that the conflicting UAIDs are invalid, and does not transmit an ACK frame for the UL MU PPDU frame to this terminal STA even if the access point AP succeeds in receiving the UL MU PPDU frame from one of the two terminals STAs designated by the conflicting UAIDs. Alternatively, the access point AP may select one of the terminals STAs, and transmit the ACK frame only to this terminal STA (one of the terminals STAs which has succeeded in receiving the UL MU PPDU frame). In addition, the access point AP operates likewise not only when the two UAIDs conflict but also when conflict between two or more UAIDs is detected. When the access point AP selects one of the terminals STAs and transmits the ACK frame only to this terminal STA, the terminal STA can decide that the ACK frame is addressed to this terminal STA based on MAC address information included in the ACK frame.

When the unassociated terminal STA cannot receive the ACK frame for this UL MU PPDU frame even though the unassociated terminal STA has transmitted the UL MU PPDU frame, the unassociated terminal STA can decide that communication of the UL MU PPDU frame has failed.

When the unassociated terminal STA cannot receive the ACK frame for the UL MU PPDU frame, the unassociated terminal STA decides that the UAIDs conflict, and can perform not uplink multi-user communication which needs the UAID but another uplink communication (e.g., uplink single user communication) which does not need the UAID. Alternatively, when the unassociated terminal STA cannot receive the ACK frame for the UL MU PPDU frame, the unassociated terminal STA may join OFDMA-based random access again. This is because UAIDs do not necessarily conflict again during OFDMA-based random access.

As described above, according to the second example, when detecting conflict between two or more UAIDs, the access point AP does not transmit an ACK frame for uplink data from the terminals STAs designated by the conflicting UAIDs. Further, the terminal STA which cannot receive the ACK frame does not join uplink multi-user communication of subsequent OFDMA-based random access, and then performs another uplink communication which does not need the UAID. Consequently, it is possible to avoid that the UAIDs conflict again.

Configuration examples of the access point AP and the terminal STA according to a certain aspect described in the above first and second examples will be described.

Figure 7:
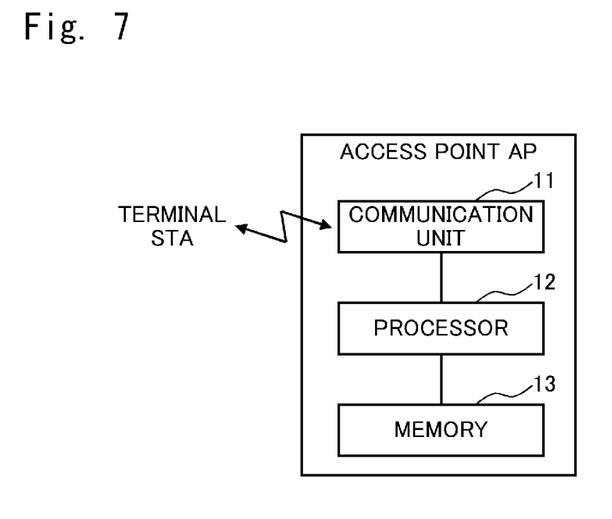
FIG. 7 is a block diagram illustrating a configuration example of an access point according to a certain aspect.

FIG. 7 is a block diagram illustrating the configuration example of the access point AP according to the certain aspect. The access point AP includes a communication unit 11, a processor 12 and a memory 13. The communication unit 11 is configured to perform wireless communication and, more specifically, uplink multi-user communication and uplink single user communication with a plurality of terminals STA in the BSS. The processor 12 is connected with the communication unit 11 so as to be able to communicate with, and is configured to control the communication unit 11 and perform processing of the above access point AP.

The memory 13 is configured to store software modules (computer programs) including a command group for performing processing of the access point AP described in the above examples and data. The memory 13 may be composed of a combination of a volatile memory and a non-volatile memory, for example.

The processor 12 is configured to read the software module (computer program) from the memory 13 and execute the software module to perform processing of the access point AP described in the above examples. The processor 12 may be, for example, a microprocessor, a Micro Processing Unit (MPU) or a Central Processing Unit (CPU). The processor 12 may include a plurality of processors.

For example, the processor 12 generates a UAID for designating the unassociated terminal STA so as to include BCB AID bits (specific bits) or bits (processed bits) obtained by processing the BCB AID bits. In this case, when including the BCB AID bits in the UAID, the processor 12 uses bits to be distinguished from those of an AID as bits other than the BCB AID bits of the UAID.

Alternatively, the processor 12 transmits the trigger frames for notifying the resource units RUs for random access, and for notifying the base values of the UAIDs for designating the unassociated terminals STAs, to a plurality of terminals STAs in the BSS. When the unassociated terminal STA transmits uplink data by using the resource unit RU for random access notified by the trigger frame, the processor 12 receives this uplink data. Furthermore, the processor 12 generates the UAID by using the base value of the UAID notified by the trigger frame, and the order of the resource unit RU for random access used to transmit uplink data among the resource units RUs for random access designated by the trigger frames.

Figure 8:
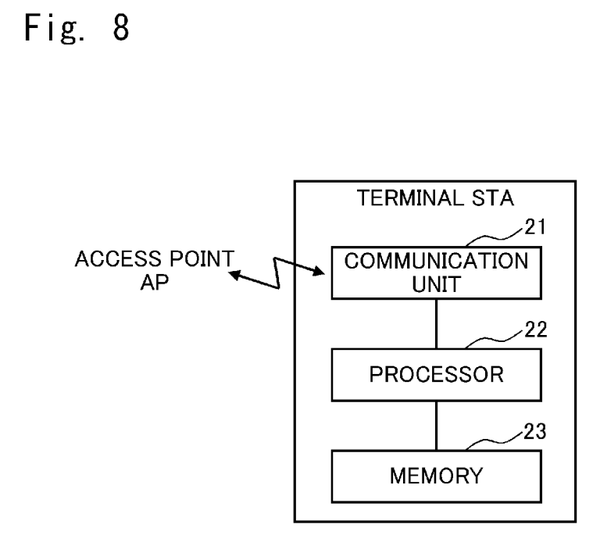
FIG. 8 is a block diagram illustrating a configuration example of a terminal according to a certain aspect.

FIG. 8 is a block diagram illustrating the configuration example of the terminal STA according to the certain aspect. The terminal STA includes a communication unit 21, a processor 22 and a memory 23. The communication unit 21 is configured to perform wireless communication and, more specifically, uplink multi-user communication and uplink single user communication with the access point AP. The processor 22 is connected with the communication unit 21 so as to be able to communicate with, and is configured to control the communication unit 21 and perform processing of the above terminal STA.

The memory 23 is configured to store software modules (computer programs) including a command group for performing processing of the terminal STA described in the above examples and data. The memory 23 may be composed of a combination of a volatile memory and a non-volatile memory, for example.

The processor 22 is configured to read the software module (computer program) from the memory 23 and execute the software module to perform processing of the terminal STA described in the above examples. The processor 22 may be, for example, a microprocessor, an MPU or a CPU. The processor 22 may include a plurality of processors.

For example, the processor 22 generates a UAID for designating the terminal STA so as to include BCB AID bits (specific bits) or bits (processed bits) obtained by processing the BCB AID bits when the terminal STA is the unassociated terminal STA. In this case, when including the BCB AID bits in the UAID, the processor 22 uses bits to be distinguished from those of an AID as bits other than the BCB AID bits of the UAID.

Alternatively, when the access point AP transmits the trigger frames for notifying the resource units RUs for random access, and for notifying the base values of the UAIDs for designating the unassociated terminals STAs, the processor 22 receives this trigger frame. When the terminal STA is the unassociated terminal STA, the processor 22 transmits uplink data to the access point AP by using the resource unit RU for random access notified by the trigger frame. Furthermore, the processor 22 generates the UAID for designating the terminal STA by using the base value of the UAID notified by the trigger frame, and the order designated by the trigger frame for the resource unit RU for random access used to transmit uplink data.

Furthermore, the above program can be stored by using various types of non-transitory computer readable media, and be supplied to a computer. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), Compact Disk-Read Only Memories (CD-ROM), CD-Recordables (CD-R), CD-ReWritables (CD-R/W) and semiconductor memories (e.g., mask ROMs, Programmable ROMs (PROM), Erasable PROMs (EPROM), flash ROMs and Random Access Memories (RAMs)). Furthermore, the programs may be supplied to the computers via various types of transitory computer readable media. The transitory computer readable media include, for example, electrical signals, optical signals and electromagnetic waves. The transitory computer readable media can supply the programs to the computers via wired communication channels such as electrical cables or optical fibers or wireless communication channels.

Various aspects of the present invention have been described with reference to the examples above. However, the present invention is not limited to the above. Various changes which one of ordinary skill in the art can understand can be made to the configuration and the details of each aspect of the present invention without departing from the scope of the invention. For example, part or entirety of the above first and second example may be mutually combined and used. For example, UAIDs could conflict in the first example, too, and therefore when the UAIDs conflict in the first example, the recovery processing according to the second example may be performed.

REFERENCE SIGNS LIST

AP ACCESS POINT
STA TERMINAL
RU RESOURCE UNIT
11 COMMUNICATION UNIT
12 PROCESSOR
13 MEMORY
21 COMMUNICATION UNIT
22 PROCESSOR
23 MEMORY

The invention claimed is:

1. A communication method of a wireless local area network (LAN) base station configured to perform uplink multi-user communication with a plurality of wireless LAN terminals, wherein
   an association identifier (AID) indicating an associated wireless LAN terminal includes a specific bit generated by using a basic service set (BSS) color bit (BCB), and
   the communication method comprises:
   generating an unassociation identifier (UAID) indicating an unassociated wireless LAN terminal, in order to include the specific bit or a processed bit obtained by processing the specific bit; and
   using a bit to be distinguished from the AID as a bit other than the specific bit of the UAID in a case where the specific bit is included in the UAID.

2. The communication method according to claim 1, wherein the processed bit is a bit obtained by inverting the specific bit.

3. The communication method according to claim 1, wherein the processed bit is a bit obtained by adding a predetermined value to the specific bit, subtracting the predetermined value from the specific bit, multiplying the specific bit with the predetermined value, or dividing the specific bit by the predetermined value.

4. The communication method according to claim 1, wherein, in a case where the specific bit is included in the UAID, the bit other than the specific bit of the UAID is a bit of a value within a range different from a range of a value used by the AID.

5. A communication method of a wireless local area network (LAN) base station configured to perform uplink multi-user communication with a plurality of wireless LAN terminals, the communication method comprising:
   transmitting a trigger frame to the plurality of wireless LAN terminals, the trigger frame including information and a base value, the information indicating a resource unit for random access, and the base value being a signaling parameter of an unassociation identifier (UAID) indicating an unassociated wireless LAN terminal;
   receiving uplink data from the unassociated wireless LAN terminal, the uplink data being transmitted by using the resource unit for random access indicated by the information included in the trigger frame; and
   generating the UAID by using the base value of the UAID and the information indicating the order of the resource unit for random access among resource units for random access, the resource unit for random access being used to transmit the uplink data.

6. The communication method according to claim 5, further comprising:
calculating a new base value of the UAID by incrementing the base value of the UAID by a number of the resource units for random access indicated by the information included in the trigger frame; and
generating a next trigger frame including the new base value of the UAID.

7. The communication method according to claim 5, further comprising not transmitting an acknowledgement (ACK) frame for uplink data to the unassociated wireless LAN terminal, the uplink data being received from the unassociated wireless LAN terminal designated by the conflicting UAID, in a case where the generated UAID conflicts.

8. A communication method of a wireless local area network (LAN) terminal of a plurality of wireless LAN terminals configured to perform uplink multi-user communication with the wireless LAN base station, wherein
an association identifier (AID) indicating an associated wireless LAN terminal includes a specific bit generated by using a basic service set (BSS) color bit (BCB), and the communication method comprises:
generating an unassociation identifier (UAID) indicating the wireless LAN terminal, in order to include the specific bit or a processed bit obtained by processing the specific bit in a case where the wireless LAN terminal is an unassociated wireless LAN terminal; and
using a bit to be distinguished from the AID as a bit other than the specific bit of the UAID in a case where the wireless LAN terminal is the unassociated wireless LAN terminal and the specific bit is included in the UAID.

9. The communication method according to claim 8, wherein the processed bit is a bit obtained by inverting the specific bit.

10. The communication method according to claim 8, wherein the processed bit is a bit obtained by adding a predetermined value to the specific bit, subtracting the predetermined value from the specific bit, multiplying the specific bit with the predetermined value, or dividing the specific bit by the predetermined value.

11. The communication method according to claim 8, wherein, in a case where the specific bit is included in the UAID, the bit other than the specific bit of the UAID is a bit of a value within a range different from a range of a value used by the AID.

12. A communication method of a wireless local area network (LAN) terminal of a plurality of wireless LAN terminals configured to perform uplink multi-user communication with the wireless LAN base station, the communication method comprising:
receiving a trigger frame from the wireless LAN base station, the trigger frame including information and a base value, the information indicating a resource unit for random access, and the base value being a signaling parameter of an unassociation identifier (UAID) indicating an unassociated wireless LAN terminal;
generating the UAID indicating the wireless LAN terminal by using the base value of the UAID included in the trigger frame, and information indicating an order of a resource unit for random access among resource units for random access in a case where the wireless LAN terminal is the unassociated wireless LAN terminal, the resource unit for random access being indicated by the information included in the trigger frame; and
transmitting uplink data to the wireless LAN base station by using the resource unit for random access indicated by the information included in the trigger frame in a case where the wireless LAN terminal is the unassociated wireless LAN terminal.

13. The communication method according to claim 12, further comprising performing uplink communication that does not need the UAID with the wireless LAN base station, in a case where the wireless LAN terminal is an unassociated wireless LAN terminal and the wireless LAN terminal does not receive the ACK frame from the wireless LAN base station after transmitting the uplink data to the wireless LAN base station.

* * * * *